(12) United States Patent
Park et al.

(10) Patent No.: US 7,321,531 B2
(45) Date of Patent: Jan. 22, 2008

(54) APPARATUS FOR REPRODUCING DATA FROM OPTICAL STORAGE MEDIUM USING MULTIPLE DETECTOR

(75) Inventors: Hyun-soo Park, Seoul (KR); Jae-seong Shim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 610 days.

(21) Appl. No.: 10/441,087

(22) Filed: May 20, 2003

(65) Prior Publication Data

US 2003/0218948 A1 Nov. 27, 2003

(30) Foreign Application Priority Data

May 21, 2002 (KR) .................. 10-2002-0028168

(51) Int. Cl.
*G11B 5/09* (2006.01)
(52) U.S. Cl. .................. 369/47.24; 369/53.22; 369/59.22
(58) Field of Classification Search ............. 369/47.23, 369/47.24, 59.17, 59.21, 59.22, 124.05, 124.07
See application file for complete search history.

(56) References Cited

U.S. PATENT DOCUMENTS 5,406,542 A * 4/1995 Morimoto .................. 369/120
6,097,685 A * 8/2000 Yamaguchi et al. ...... 369/59.22
6,192,016 B1 * 2/2001 Kim ......................... 369/59.2
6,266,303 B1 * 7/2001 Buchler ................... 369/44.29
6,266,305 B1 * 7/2001 Buchler ................... 369/44.32
6,345,020 B1 * 2/2002 Cho et al. ................ 369/44.32
6,396,782 B1 * 5/2002 Kabutz et al. ........... 369/47.27
6,463,014 B1 * 10/2002 Kanou et al. ................ 369/5
6,904,110 B2 * 6/2005 Trans et al. ................ 375/350
7,095,698 B2 * 8/2006 Uchida ................... 369/59.24

FOREIGN PATENT DOCUMENTS

| JP | 07-111042 | 4/1995 |
| JP | 08-212716 | 8/1996 |
| JP | 10-312539 | 11/1998 |
| WO | WO 01/17872 | 3/2000 |

* cited by examiner

*Primary Examiner*—Wayne Young
*Assistant Examiner*—Adam R. Giesy
(74) *Attorney, Agent, or Firm*—Stein, McEwen & Bui, LLP (57) ABSTRACT

An apparatus includes a multiple detecting unit having n detectors, and a controller which selects one of the n detectors and controls the selected detector to output a binary signal. In the apparatus, a plurality of detectors are used to detect a signal read from an optical storage medium, and the optimum detector is selected in consideration of a quality of the signal and detection conditions, thereby increasing the efficiency of a signal reproduction. The apparatus can selectively compensate for disturbance of a signal where data from the optical storage medium is reproduced. The apparatus may control a run length of the signal to be 3T.

9 Claims, 9 Drawing Sheets

APPARATUS FOR REPRODUCING DATA FROM OPTICAL STORAGE MEDIUM USING MULTIPLE DETECTOR

CROSS-REFERENCE TO RELATED APPLICATIONS

This application claims the benefit of Korean Patent Application No. 2002-28168, filed May 21, 2002 in the Korean Intellectual Property Office (KIPO), which is incorporated herein by reference.

BACKGROUND OF THE INVENTION

1. Field of the Invention

The present invention relates to reproducing data from an optical storage medium, and more particularly, to an apparatus which detects data recorded on an optical storage medium using a multiple detector so as to guarantee a stable reproduction of the data.

2. Description of the Related Art

Figure 1A:
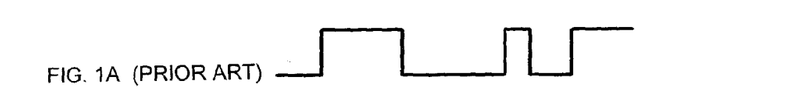
FIG. 1A is a diagram illustrating a binary signal recorded on an optical storage medium.
Figure 1B:
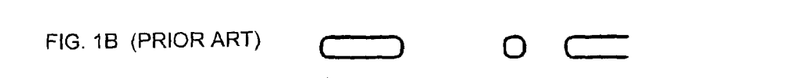
FIG. 1B is a diagram illustrating the shape of pits recorded on a surface of the recording storage medium.
Figure 1C:
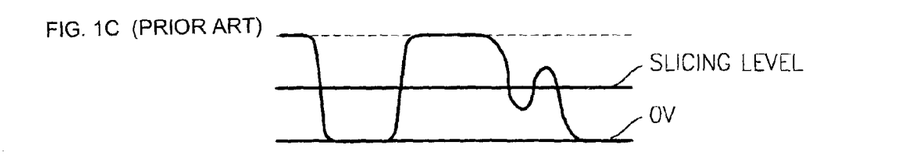
FIG. 1C is a graph illustrating an example of an actual RF signal read from the optical storage medium.

FIG. 1A shows a binary signal recorded on an optical storage medium (not shown). FIG. 1B shows the shape of pits recorded on the optical storage medium. FIG. 1C shows an example of an actual radio-frequency (RF) signal read from the optical storage medium.

Generally, the binary signal is recorded as the pits on a surface of the optical storage medium using a laser beam. During a reproduction of data from the optical storage medium, a signal, i.e., a pickup signal, which is detected from the surface of the optical storage medium using a pickup device, must be filtered by a low-pass filter to account for optical frequency characteristics of the laser beam and a reading circuit. Therefore, the RF signal read from the optical storage medium does not have the same form as the binary signal originally recorded on the optical storage medium.

Figure 2A:
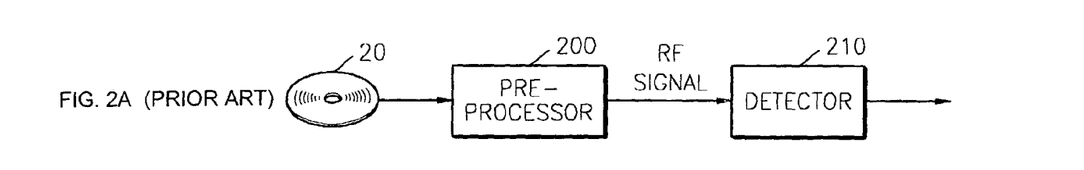
FIG. 2A is a block diagram of a conventional signal detection circuit for a known optical storage medium.

FIG. 2A shows a conventional signal detecting circuit used with a conventional optical storage medium 20. A signal from the conventional optical storage medium 20 is detected using a pre-processor 200 and a detection circuit 210. The pre-processor 200 processes, i.e., filters, a pickup signal read from the optical storage medium 20 and outputs the processed pickup signal as an RF signal. The detection circuit 210 converts the RF signal output from the pre-processor 200 into a binary signal and outputs the binary signal.

Figure 2B:
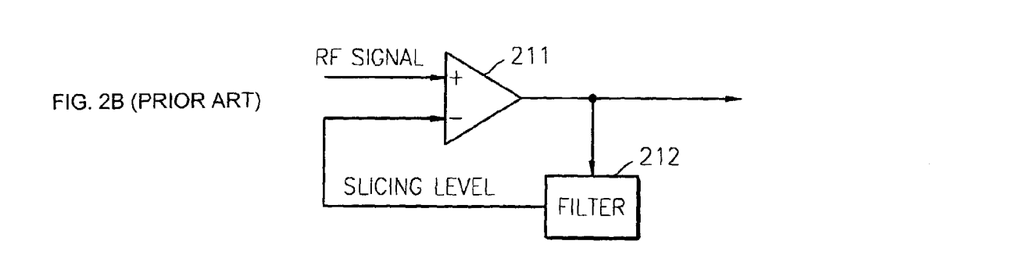
FIG. 2B is a diagram of a conventional detection circuit using a slicer as a detector, shown in FIG. 2A.

There are various types of circuits and methods to restore the RF signal to an original binary signal. For example, FIG. 2B illustrates a conventional detection circuit 210, which uses a slicer as a detector, that is included in the circuit of FIG. 2A.

The detection circuit 210 includes a comparator 211 and a filter 212. The comparator 211 compares an RF signal output from the pre-processor 200 with a signal of a predetermined slicing level. Then, the comparator 211 converts the RF signal into a binary signal by outputting a high level where a level of the RF signal is higher than that of the slicing-level signal, and by outputting a low level where a level of the RF signal is lower than that of the slicing-level signal. The filter 212 is a low-pass filter that filters an output of the comparator 211 and outputs a binary level.

Where an RF signal passes through the comparator 211 and is converted into a binary signal, it is important to appropriately determine a reference level, i.e., a slicing level, of the comparator 211. The slicing level is obtained by passing the binary signal output from the comparator 211 through the filter 212, i.e., the low-pass filter, and making the level of the binary signal to be equivalent to a DC component of the binary signal. Then, the RF signal is compared with the determined slicing level. Based on the comparison result, a binary signal is derived. Such a slicer detection circuit is commonly used to convert a signal read from an optical storage medium into a binary signal.

In addition to the above method, there are other methods of detecting and converting an RF signal into a binary signal. However, various types of optical storage media have been developed recently, and for many reasons, an RF signal is easily distorted. Accordingly, an apparatus and a method of obtaining a binary signal of a good quality from the RF signal are required.

SUMMARY OF THE INVENTION

Accordingly, it is an aspect of the present invention to provide an apparatus for reproducing a good-quality binary signal from an RF signal detected from an optical storage medium, using at least two detectors, for example, a multiple detector having n detectors.

Additional aspects and advantages of the invention will be set forth in part in the description which follows and, in part, will be obvious from the description, or may be learned by practice of the invention.

To achieve the above and/or other aspects of the present invention, there is provided an apparatus for detecting a signal read from an optical storage medium, the apparatus comprising a multiple detecting unit including n detectors, and a controller which selects one of the n detectors and converts the read signal into a binary signal using the selected detector.

The apparatus may further comprise a delay unit which delays output signals of the n detectors to synchronize the output signals from the n detectors. A delaying time of the delay unit may be controlled by the controller.

The apparatus may further comprise a read signal quality measuring unit which provides information regarding a quality of the read signal input to the multiple detecting unit, to the controller, wherein the controller selects the one of the n detectors based on the information.

The apparatus may further comprise an output signal quality measuring unit which measures qualities of binary signals output from the n detectors and provides information regarding the measured qualities to the controller, wherein the controller selects the one of the n detectors based on the information.

The controller may select the one of the n detectors depending on whether the signal read from the optical storage medium comprises a header signal.

The n detectors may include a slicer detector which converts the signal into the binary signal, and the slicer detector may include a comparator and a low-pass filter.

The n detectors may include a digital detector which converts the read signal into a digital signal, removes a DC offset from the digital signal, passes the digital signal through a sign detection operation, and outputs the result as the binary signal.

The n detectors may include a run-length compensator which compensates for a run length of the read signal.

The n detectors may include a detector which compensates for a run length of the read signal that passed through an equalizer operation.

The n detectors may include a detector including a Viterbi decoder.

The n detectors may include a detector which converts the read signal into a digital signal, removes a DC offset from the digital signal, passes the digital signal through an equalizer operation, and outputs the binary output, and the detector may include a Viterbi decoder.

The read signal quality measuring unit may comprise a jitter detection unit which measures a jitter from a radio-frequency (RF) signal read from the optical storage medium and transmits the measured jitter to the controller, wherein the controller selects the one of the n detectors based on the measured jitter.

The read signal quality measuring unit may comprise an asymmetry detection unit which measures an asymmetry of an RF signal read from the optical storage medium and provides information regarding the asymmetry of the RF signal to the controller, wherein the controller selects the one of the n detectors based on the information.

The output signal quality measuring unit may comprise a sync counter which detects and counts a sync signal from binary signals output from the n detectors, and provides a count value thereof to the controller, and the controller may estimate qualities of the n detectors using the count value.

The output signal quality measuring unit may comprise an error detector which detects errors in binary signals output from the n detectors and provides an error rate thereof to the controller, and the controller may estimate qualities of the n detectors using the error rate.

The controller may select the one of the n detectors according to whether the signal read from the optical storage medium is read from a CD or a DVD.

To achieve the above and/or other aspects of the present invention, there is provided an apparatus for reproducing an RF signal read from an optical storage medium using a multiple detecting unit, the apparatus comprising a first detector which detects the RF signal using an analog method, a second detector which performs a Viterbi decoding and detects the RF signal, and a controller which selects the first or second detector depending on whether the RF signal is output from a CD or a DVD, so as to obtain a binary signal from the first or second detector.

To achieve the above and/or other aspects of the present invention, there is provided another apparatus for reproducing an RF signal read from an optical storage medium using a multiple detecting unit, the apparatus comprising a first detector which compensates for a run length of the RF signal, a second detector which performs a Viterbi decoding and detects the RF signal, and a controller which refers sync count values of binary signals output from the first and second detectors, selects the first or second detector that generates a larger one of the sync count values, and controls the selected detector to output a binary signal.

To achieve the above and/or other aspects of the present invention, there is provided yet another apparatus for reproducing an RF signal read from an optical storage medium, the apparatus comprising a first detector which compensates for a run length of the RF signal, a second detector which performs a Viterbi decoding and detects the RF signal, and a controller which selects the first detector in response to an asymmetry of the RF signal being more than a predetermined level, selects the second detector in response to the asymmetry of the RF signal being equal to or less than the predetermined level, and controls the selected detector to output a binary signal.

To achieve the above and/or other aspects of the present invention, there is provided still another apparatus for reproducing an RF signal read from an optical storage medium, the apparatus comprising a first detector which compensates for a run length of the RF signal, a second detector which performs a Viterbi decoding and detects the RF signal, and a controller which selects the first detector in response to the RF signal comprising a header signal, selects the second detector in response to the RF signal not comprising the header signal, and controls the selected detector to output a binary signal.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number of 2 or more, and a controller which selects one of the n detectors and controls the selected detector to output a corresponding one of the binary signals, wherein the controller selects the one of the n detectors having a largest count value, and the count value is obtained by counting sync signals contained in the binary signals output from the n detectors.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, and a controller which selects one of the n detectors and controls the selected detector to output a corresponding one of the binary signals, wherein the controller selects the one of the n detectors having a lowest rate of errors contained in the binary signals output from the n detectors.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, and a controller which selects one of the n detectors and controls the selected detector to output a corresponding one of the binary signals, wherein the controller selects the one of the n detectors depending on whether an asymmetry of the RF signal is more than a predetermined level.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, and a controller which selects one of the n detectors and controls the selected detector to output a corresponding one of the binary signals, wherein the controller detects a jitter from the RF signal and selects the one of the n detectors based on the jitter.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, and a controller which selects one of the n detectors and controls the selected detector to output a corresponding one of the binary signals, wherein the controller selects the one of the n detectors depending on whether the RF signal is output from a CD or a DVD.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, and a controller which selects one of the n detectors and controls the selected detector to output a corresponding one of the binary signals, wherein the controller selects the one of the n detectors depending on whether the RF signal comprises a header signal.

To achieve the above and/or other aspects of the present invention, there is provided still yet another apparatus for reproducing an RF signal read from an optical storage medium using a multiple detector, the apparatus comprising n detectors which detect the RF signal and generate binary signals, wherein n is a natural number 2 or more, a delayer which delays the binary signals output from the n detectors, and a controller which selects the one of the n detectors and controls the selected detector to output a corresponding one of the binary signals, wherein the delayer delays the binary signals so as to synchronize the binary signals from the n detectors.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
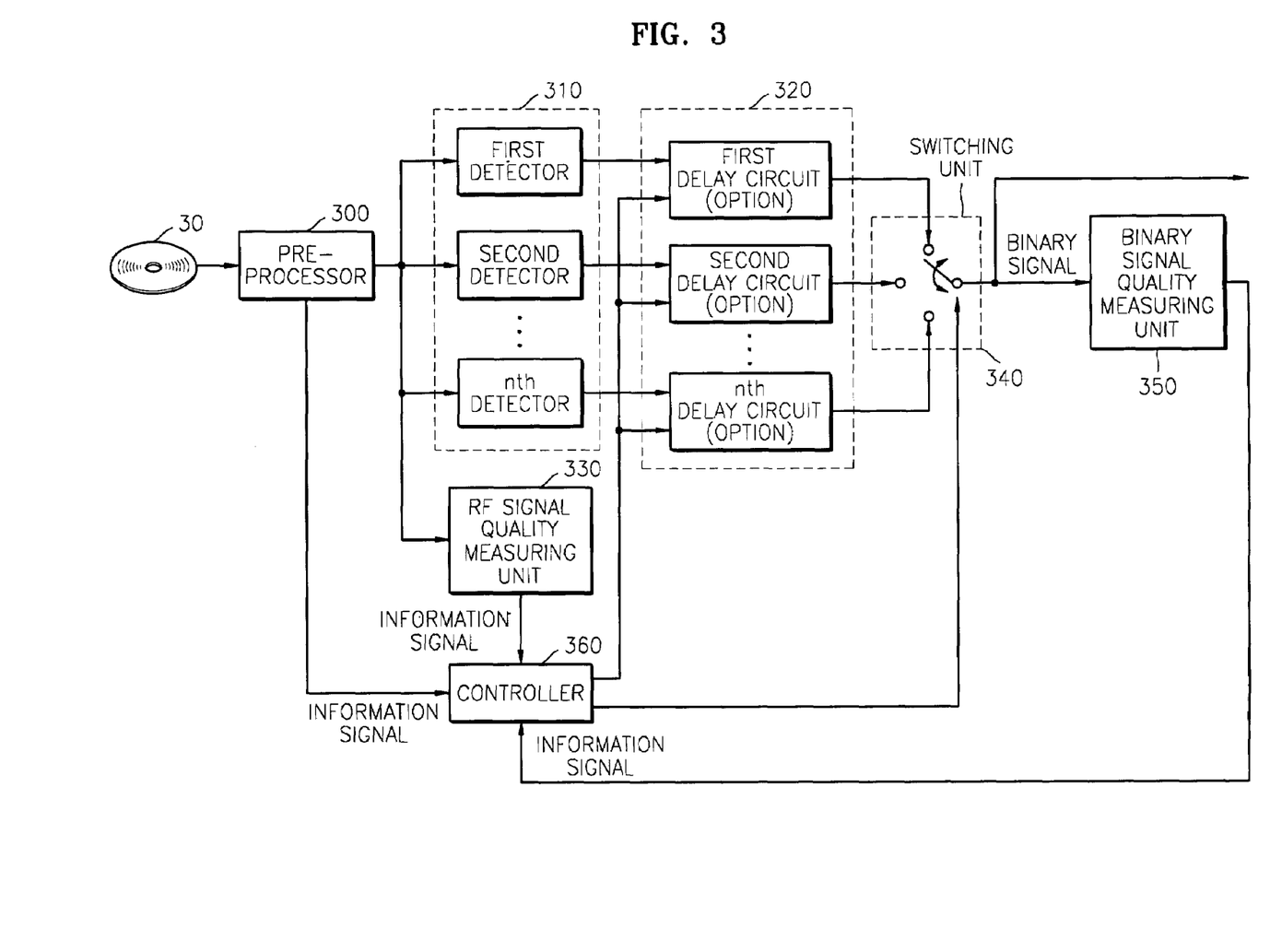
FIG. 3 is a block diagram of an apparatus for reproducing data from an optical storage medium using a multiple detector, according to an embodiment of the present invention.

FIG. 3 shows a block diagram of an apparatus for reproducing data from an optical storage medium 30 using a multiple detector, according to an embodiment of the present invention. The apparatus includes a pre-processor 300, a multiple detecting unit 310, a delaying unit 320, a radio-frequency (RF) signal quality measuring unit 330, a switching unit 340, a binary signal quality measuring unit 350, and a controller 360.

The pre-processor 300 filters a signal read from the optical storage medium 30 and outputs the filtering result as an RF signal.

The multiple detecting unit 310 includes n detectors that detect and binarize the RF signal. The n detectors detect and binarize the RF signal using different methods, and output the binarized RF signals. Examples of the detectors included in the multiple detecting unit 310 will be explained later with reference to FIGS. 8A-8F.

While the delaying unit 320 is shown in FIG. 3, inclusion of the delaying unit 320 is optional in the apparatus. The delaying unit 320 is connected to the n detectors to delay binarized signals output from the n detectors. That is, because the n detectors may have different signal processing times, their outputs may be delayed to be synchronized.

The inclusion of the RF signal quality measuring unit 330 is also optional in the apparatus. The RF signal quality measuring unit 330 measures an input RF signal and outputs the measurement result to determine the quality of binary signals output from the multiple detecting unit 310. A representative of the RF signal quality measuring unit 330 may be, for example, a jitter detecting circuit that measures the amount of noise included in the input signal, that is, a signal to noise ratio in an input signal. A jitter value output from the jitter detecting circuit corresponds to an output of the RF signal quality measuring unit 330. The jitter value is provided as information for which the controller 360 selects a desired detector (selection of a detector will be described later). On the other hand, the RF signal quality measuring unit 330 may be an asymmetry measuring device that checks an asymmetry of a signal and provides the checked result as numerical information. The asymmetry of a signal is also provided to the controller 360 to help the controller 360 select a desired detector.

The switching unit 340 receives a detector selection signal (or a control signal) from the controller 360 and selects a signal output from one of the n detectors included in the multiple detecting unit 310.

The binary signal quality measuring unit 350 measures the quality of an output binary signal selected by the switching unit 340 via the delaying unit 320. The binary signal quality measuring unit 350 may be a sync counter circuit. A sync signal is output from an optical storage medium at predetermined instants of time. An output of the sync counter circuit is obtained by counting the number of sync signals contained in a binary signal output from a detector. Therefore, where the quality of the binary signal is poor, sync signals to be detected at predetermined instants of time are hardly detected, thereby lowering a count value obtained by counting the number of the sync signals. On the other hand, the binary signal quality measuring unit 350 may be a circuit that corrects errors in a binary signal output from a detector, detects the number of errors, and outputs the number of errors generated for a predetermined time. In the circuit, the smaller the number of errors, the higher the quality of the binary signal.

The binary signal quality measuring unit 350 may have a test duration to measure the quality of signals output from the n detectors of the multiple detecting unit 310.

The controller 360 determines the performance of a detector based on outputs of the RF signal quality measuring unit 330 and the binary signal quality measuring unit 350, and generates a selection control signal to select one of the n detectors of the multiple detecting unit 320 based on the determined performance of the detector. In other words, in response to a jitter value of an RF signal, it is possible to select an appropriate detector out of the n detectors of the multiple detecting unit 310 in consideration of the jitter value. Also, in response to asymmetry information of the RF signal, an appropriate one of the n detectors of the multiple detecting unit 310 may be selected according to a degree of the asymmetry of the RF signal. In case the controller 360 receives sync count values from the n detectors, it may select a detector having the largest count value. Also, where the controller 360 receives error rates, i.e., error count values, of the n detectors, it may select a detector having the smallest error rate.

The controller 360 may select a detector depending on whether an input signal is a header signal or a user data signal, as well as information regarding the qualities of signals. The header signal contains position information in a recordable optical storage medium such as DVD-RAM, and thus, the control of the pickup position or the recognition of positions in an optical storage medium can be performed based on information contained in the header signal. Since the header signal is an important factor to obtain a lower error rate in reading the header signal, the header signal should usually be recorded on an optical storage medium, using an encoding algorithm that makes a run length of the header signal longer than that of a typical data signal. Therefore, the controller 360 is set to select a detector including a run length compensator in response to an input header signal, and select a general detector, for example, a detector including a Viterbi decoder, in response to a signal other than the header signal.

The controller 360 may be implemented as a digital logic circuit and a microcomputer that generate a control signal to select a desired detector. Also, the controller 360 may set a delay-period of the delaying unit 320.

Figure 4:
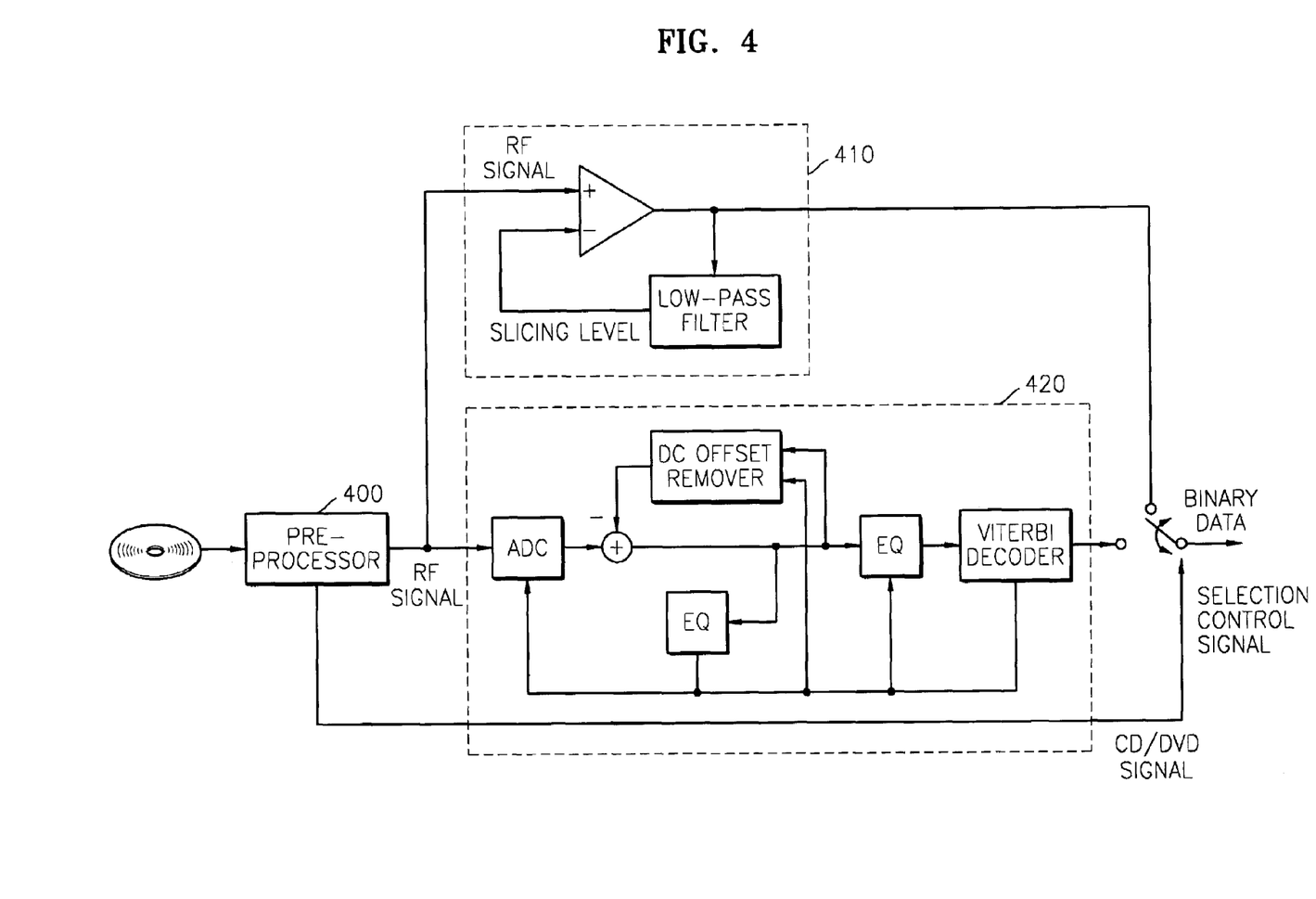
FIG. 4 is a block diagram of an apparatus for reproducing data from an optical storage medium using a multiple detector, according to another embodiment of the present invention.

FIG. 4 shows a block diagram of an apparatus for reproducing data from an optical storage medium using a multiple detector, according to another embodiment of the present invention. According to this embodiment, the apparatus for reproducing data from the optical storage medium is a CD/DVD reproducing apparatus. Referring to FIG. 4, a first detector of the apparatus includes an analog detector 410 that detects a CD signal, and a second detector of the apparatus includes a digital Viterbi decoder 420 that detects a DVD signal. A pre-processor outputs a selection control signal to select one of the first and second detectors 410 and 420. For example, the selection control signal selects the first detector 410 where the optical storage medium is a CD and selects the second detector 420 where the optical storage medium is a DVD. Accordingly, the apparatus of FIG. 4 does not additionally require a controller to select a desired detector. In general, a CD has superior modulation characteristics compared to a DVD and does not require the digital Viterbi decoder 420. Also, an existing detection circuit is available for the CD, and thus, a general analog detector is used for the CD. Meanwhile, a DVD has higher recording density that may cause errors during a detection of a read signal, and may require the Viterbi decoder 420 to improve the functions of the detection of the read signal.

Figure 5:
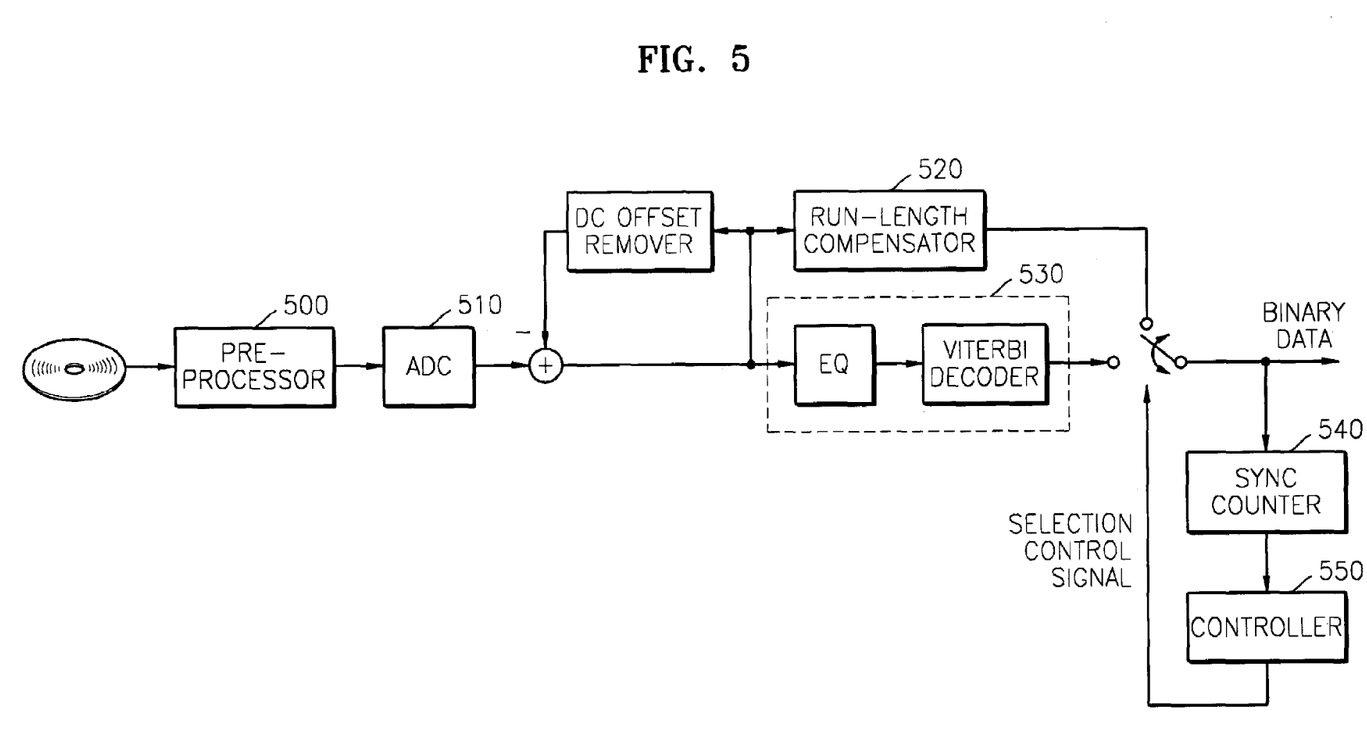
FIG. 5 is a block diagram of an apparatus for reproducing data from an optical storage medium using a multiple detector, according to yet another embodiment of the present invention.

FIG. 5 shows a block diagram of an apparatus for reproducing data from an optical storage medium using a multiple detector, according to yet another embodiment of the present invention. Referring to FIG. 5, an RF signal output from a pre-processor 500 is converted into a digital signal via an analog-to-digital converter (ADC) 510. The converted signal is detected using a first detector 520 or a second detector 530. The first detector 520 is a run-length compensating circuit and the second detector 530 includes a Viterbi decoder.

A sync counter 540 corresponds to the binary signal quality measuring unit 530 of FIG. 3. A controller 550 receives sync count values of signals output from the first and second detectors 520 from the sync counter 540, compares these sync count values, and selects the larger of the two sync count values.

Figure 6:
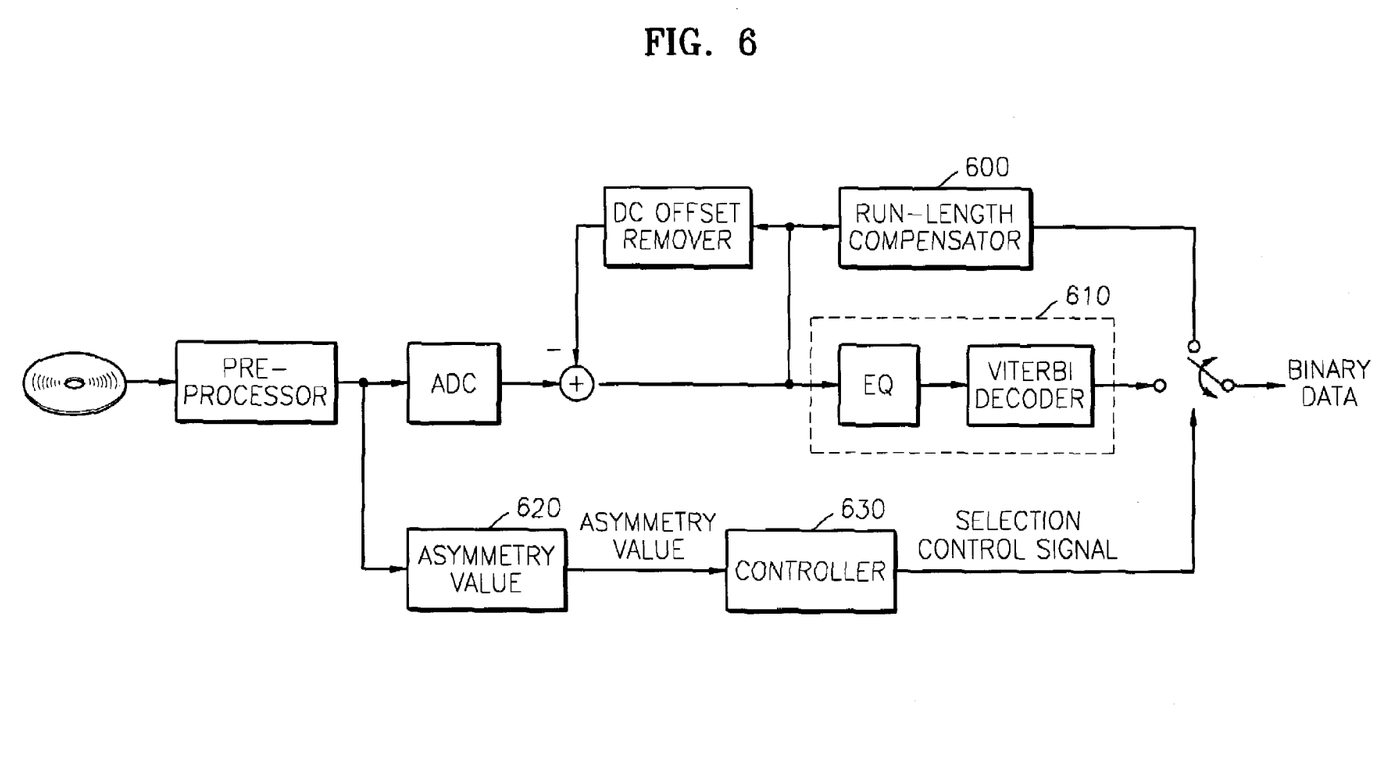
FIG. 6 is a block diagram of an apparatus for reproducing data from an optical storage medium using a multiple detector, according to still another embodiment of the present invention.

FIG. 6 is a block diagram of an apparatus for reproducing data from an optical storage medium using a multiple detector, according to still another embodiment of the present invention. Referring to FIG. 6, a first detector 600 is, for example, a run-length compensating circuit and a second detector 610 includes a Viterbi decoder. The apparatus further includes an asymmetry measuring unit 620. The asymmetry measuring unit 620 checks an asymmetry of an RF signal to measure the quality of the RF signal.

A controller 630 reads an asymmetry value detected by the asymmetry measuring unit 620 from the optical storage medium and selects one of the first and second detectors 600 and 610. Where the asymmetry of the RF signal is more than a predetermined level, the controller 630 selects the first detector 600 which is the run-length compensating circuit. Otherwise, i.e., where the asymmetry of the RF signal is less than the predetermined level, the controller 630 selects the second detector 610 which includes the Viterbi decoder. Generally, in the case of a CD or DVD, the higher the asymmetry of a signal, the more a signal that violates a run length such as 1T or 2T is detected. Accordingly, the first detector 600, which is the run-length compensating circuit, is selected where the asymmetry of the RF signal is more than the predetermined level, and the second detector 610, which includes the Viterbi decoder, is selected otherwise.

Figure 7:
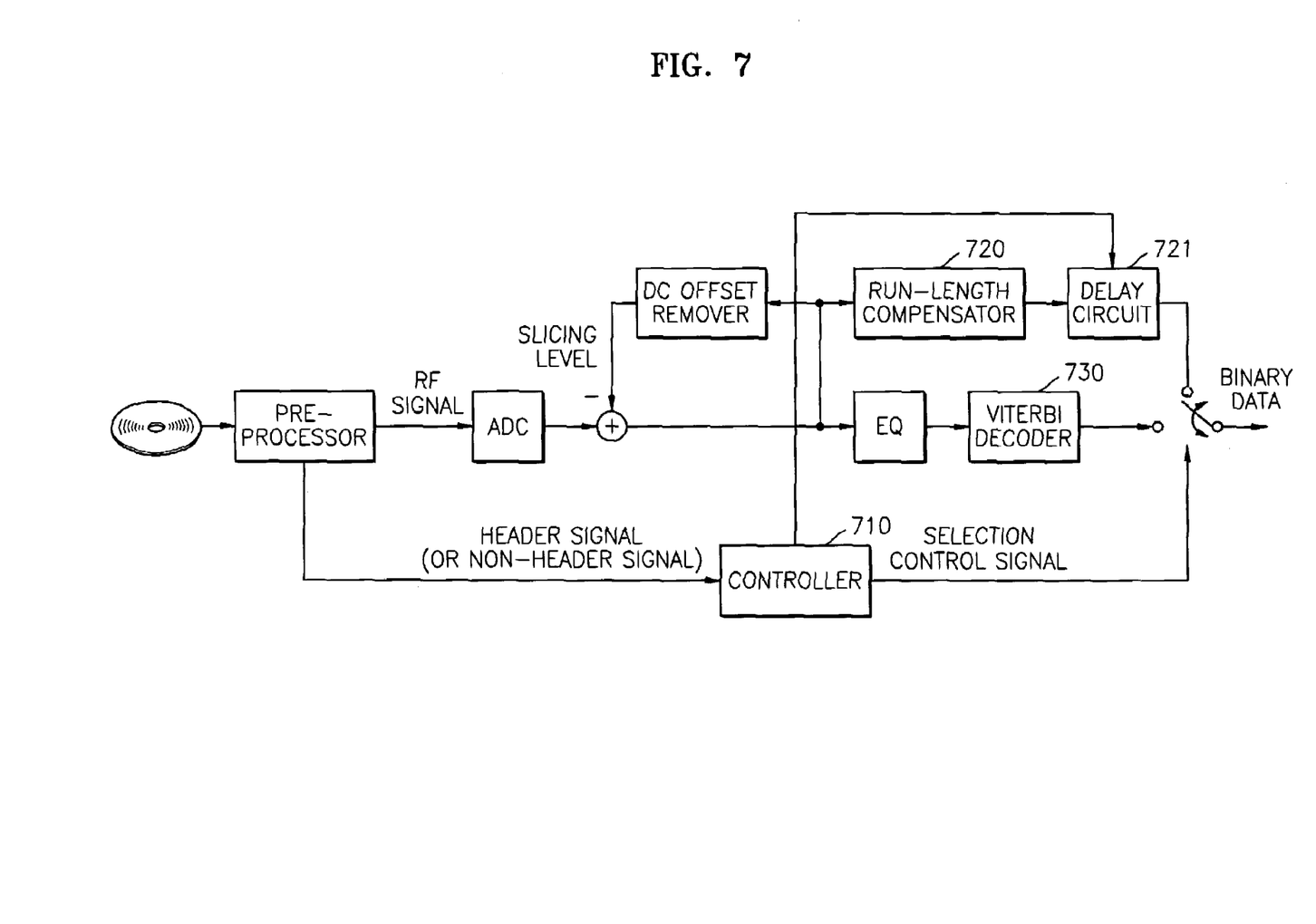
FIG. 7 is a block diagram of an apparatus for reproducing data from an optical storage medium using a multiple detector, according to a still yet another embodiment of the present invention.

FIG. 7 is a block diagram of an apparatus for reproducing data from an optical storage medium, according to still yet another embodiment of the present invention. Referring to FIG. 7, a first detector 720 and a second detector 730 are, for example, a run-length compensator and a Viterbi decoder, respectively.

The first or second detector 720 or 730 is selected depending on whether an input signal is a header signal. Where the input signal is a header section signal, the input signal passes through the first detector 720, and otherwise, the input signal passes through the second detector 730. Whether the input signal is the header signal or not is determined by a pre-processor 700, and the determination result is sent to a controller 710. Based on the result, the controller 710 can select the first or second detector 720 or 730.

To reproduce a signal read from the optical storage medium in real time, a delay circuit 721 is connected to the first detector 720, i.e., the run-length compensator, that delays the output of a binary signal for a shorter time. In this way, the output timing of the signal can be adjusted to be the same as that of a binary signal output from the second detector 730, i.e., the Viterbi decoder. The controller 710 may also determine the time of delaying the output of the binary signal using the delay circuit 721.

Figure 8A:
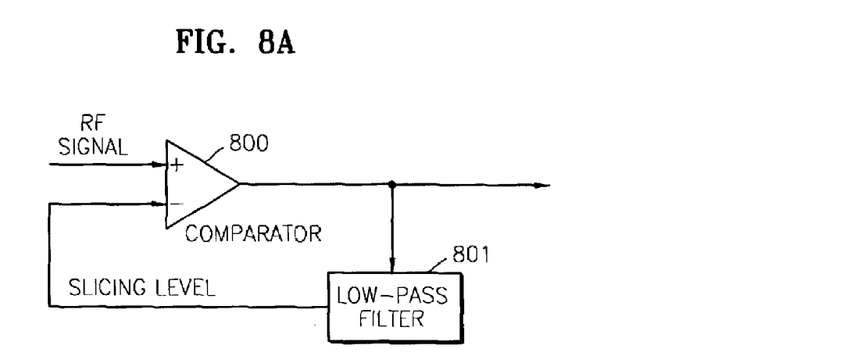
FIGS. 8A through 8F are block diagrams of examples of a detector that can be included in a multiple detecting unit of FIG. 3.

FIG. 8A shows a circuit diagram of a slicer which is an analog detector. The slicer includes a comparator 800 and a low-pass filter 801. An RF signal, which is read from an optical storage medium (not shown) and output via a pre-processor (not shown), passes through the comparator 800 to obtain a binary signal. To obtain the binary signal, a reference level, i.e., a slicing level, of the comparator 800 must be determined. The slicing level is obtained by passing a signal output from the comparator 800 through the low-pass filter 801 and adjusting the level of the signal to be equivalent to a DC component of the binary signal.

Figure 8B:
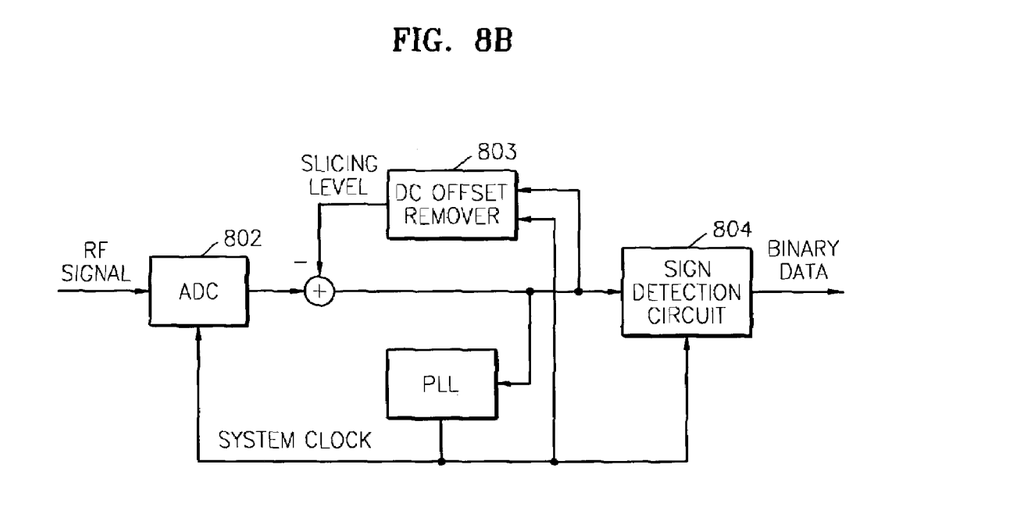

FIG. 8B shows an example of a digital detector according to the present invention. Referring to FIG. 8B, an RF signal is input to an ADC 802 and sampled in response to a system clock output from a phase locked loop (PLL). Next, a subtraction of a slicing level output from a DC offset remover 803 from the sampled RF signal is performed, and the result is input to a sign detection circuit 804. The sign detection circuit 804 measures an average value of two signals, which are input with a time difference, and determines and outputs the sign of the average value. The sampled signal whose offset is removed by the DC offset remover 803 is again input to the DC offset remover 803, and finally, the slicing level whose DC component is removed is obtained.

Figure 8C:
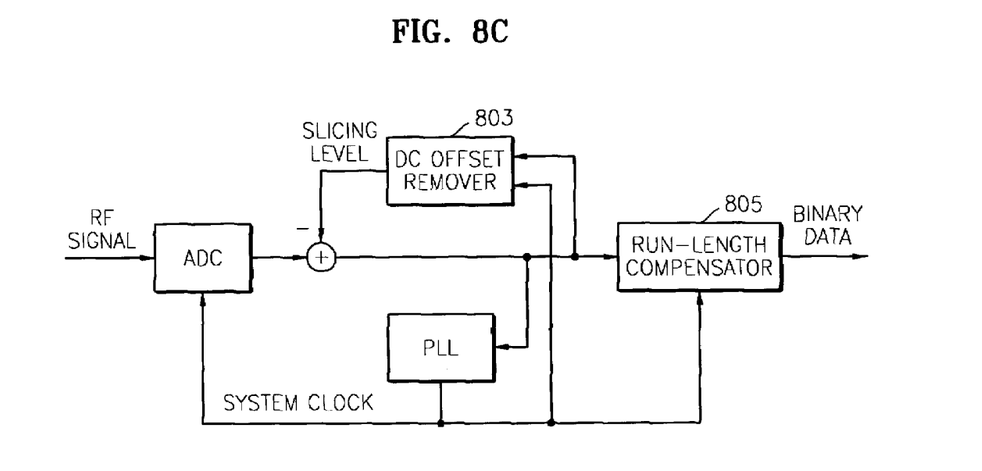

FIG. 8C shows a digital detector including a run-length compensator 805, according to the present invention. The run-length compensator 805 is a circuit that compensates for an improper run-length of data, the data having been sampled and DC removed. For instance, in the case of a disc such as a CD or DVD, the shortest of binary signal has a length of 3T (T refers to a clock cycle of a channel). Where a signal of length 1T or 2T is detected, the run-length compensator 805 forcibly converts the length of that signal to 3T.

Figure 8D:
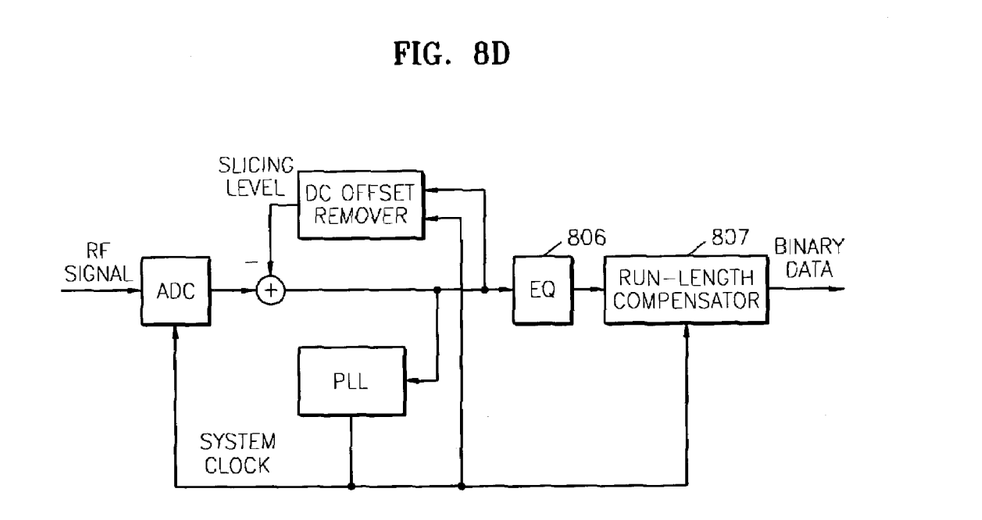

FIG. 8D shows another digital detector including a run-length compensator 807, according to the present invention. Referring to FIG. 8D, an equalizer (EQ) 806 is one of finite impulse response (FIR) filters used to optimize channel characteristics. The EQ 806 may be implemented having a fixed filter coefficient or a variable filter constant. The EQ 806 optimizes channel characteristics of an input RF signal. The optimized RF signal is input to the run-length compensator 807 to compensate for a run-length of the RF signal, and the run-length compensated RF signal is finally output as binary data.

Figure 8E:
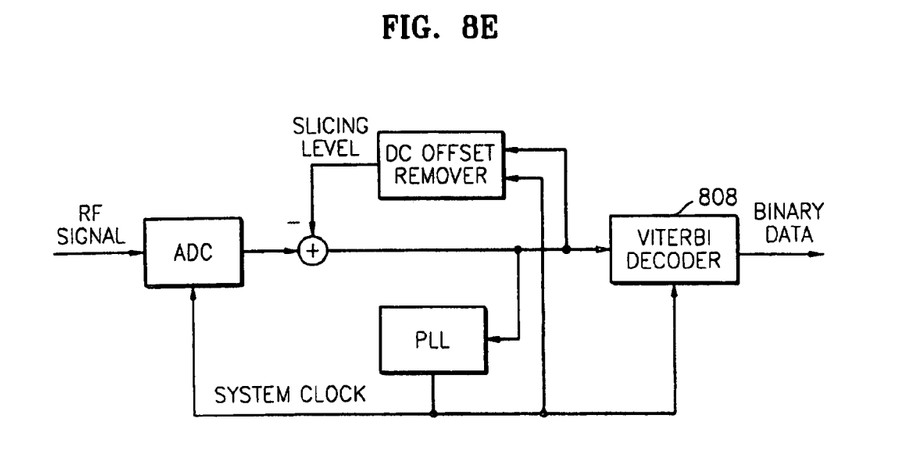

FIG. 8E shows a digital detector using a Viterbi decoder 808, according to the present invention. Here, an input RF signal is sampled to be a digital signal, a DC offset in the RF signal is removed, and the RF signal is output as a binary signal through the Viterbi decoder 808. The Viterbi decoder 808 detects the binary signal using an optimal way according to channel characteristics. The Viterbi decoder 808 has superior signal detection characteristics compared to a general signal detection circuit or a run-length compensator.

Figure 8F:
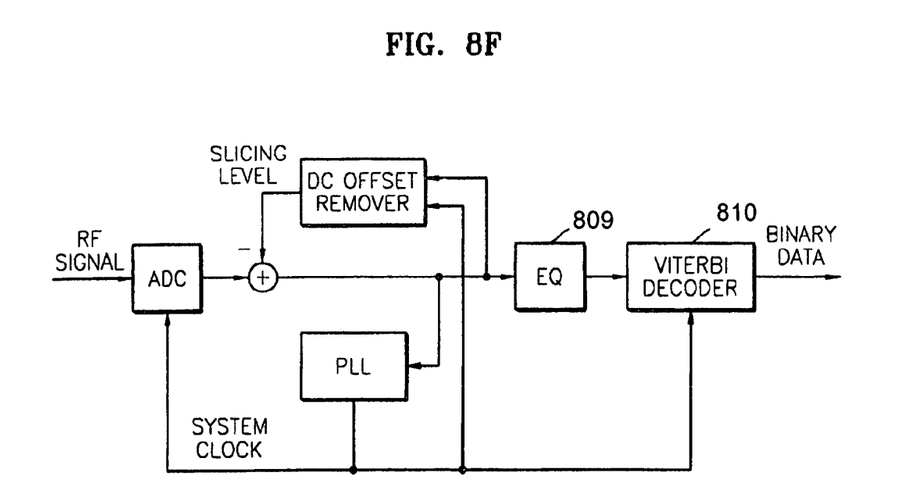

FIG. 8F shows another detector using a Viterbi decoder 810, according to the present invention. Unlike the detector of FIG. 8E, the detector of FIG. 8F further includes an equalizer (EQ) 809 to optimize an RF signal before it is input to the Viterbi decoder 810.

As described above, where data stored in an optical storage medium is reproduced using a reproduction apparatus including a multiple detector according to the present invention, a signal is detected and reproduced using a desired detector selected according to the performance of the detector, as well as the type or specification of a signal read from the optical storage medium. Therefore, the quality of the signal can be improved. In particular, where a run-length compensating circuit and a Viterbi decoder are selected as detectors, an appropriate detector is selected depending on whether a signal output from an optical storage medium, for example, a DVD-RAM in which a header signal is recorded, is a header signal. That is, the run-length compensating circuit is selected in response to the signal being the header signal, and the Viterbi decoder is selected otherwise, thereby enabling a detection of a good quality signal and a reproduction of good-quality data thereof.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus for detecting a signal read from an optical storage medium, comprising:
    a multiple detecting unit including n detectors;
    a controller which selects one of the n detectors and converts the read signal into a binary signal using the selected detector; and
    a read signal quality measuring unit which provides information regarding a quality of the read signal, which is input to the multiple detecting unit, to the controller, wherein the controller selects the one of the n detectors based on the information;
    wherein the read signal quality measuring unit comprises a jitter detection unit which measures a jitter from a radio-frequency (RF) signal read from the optical storage medium and transmits the measured jitter to the controller, wherein the controller selects the one of the n detectors based on the measured jitter.

2. The apparatus of claim 1, wherein the n detectors include a digital detector which converts the read signal into a digital signal, removes a DC offset from the digital signal, passes the digital signal through a sign detection operation, and outputs the result as the binary signal.

3. The apparatus of claim 1, wherein the read signal quality measuring unit comprises an asymmetry detection unit which measures an asymmetry of an RF signal read from the optical storage medium and provides information regarding the asymmetry of the RF signal to the controller, wherein the controller selects the one of the n detectors based on the information.

4. An apparatus for detecting a signal read from an optical storage medium, comprising:
    a multiple detecting unit including n detectors;
    a controller which selects one of the n detectors and converts the read signal into a binary signal using the selected detector; and
    an output signal quality measuring unit which measures qualities of binary signals output from the n detectors and provides information regarding the measured qualities to the controller, wherein the controller selects the one of the n detectors based on the information;
    wherein:
    the output signal quality measuring unit comprises a sync counter which detects and counts a sync signal from binary signals output from the n detectors, and provides a count value thereof to the controller, and
    the controller estimates qualities of the n detectors using the count value.

5. The apparatus of claim 4 wherein:
    the output signal quality measuring unit comprises an error detector which detects errors in binary signals output from the n detectors and provides an error rate thereof to the controller, and the controller estimates qualities of the n detectors using the error rate.

6. An apparatus for reproducing an RF signal read from an optical storage medium using a multiple detecting unit, the apparatus comprising:

a first detector which compensates for a run length of the RF signal;

a second detector which performs a Viterbi decoding and detects the RF signal; and a controller which refers sync count values of binary signals output from the first and second detectors, selects the first or second detector that generates a larger one of the sync count values, and controls the selected detector to output a binary signal.

7. An apparatus for detecting a signal read from an optical storage medium, comprising:

a multiple detecting unit including n detectors; and a controller which selects one of the n detectors and converts the read signal into a binary signal using the selected detector;

wherein the read signal is simultaneously input to all of the n detectors;

wherein the n detectors simultaneously convert the read signal into n respective binary signals; and wherein the controller selects one of the n respective binary signals and outputs the selected one of the n respective binary signals as the binary signal.

8. A method of detecting a signal read from an optical storage medium, comprising:

inputting the read signal into a multiple detecting unit including n detectors;

measuring a quality of the read signal input to the multiple detecting unit to obtain information regarding a quality of the read signal;

selecting one of the n detectors based on the information regarding a quality of the read signal; and converting the read signal into a binary signal using the selected detector;

wherein the measuring of a quality of the read signal comprises measuring a jitter from a radio-frequency (RF) signal read from the optical storage medium; and wherein the selecting of one of the n detectors comprises selecting one of the n detectors based on the measured jitter.

9. A method of detecting a signal read from an optical storage medium, comprising:

inputting the read signal into a multiple detecting unit including n detectors;

measuring qualities of binary signals output from the n detectors to obtain information regarding the measured qualities;

selecting one of the n detectors based on the information regarding the measured qualities; and converting the read signal into a binary signal using the selected detector;

wherein the measuring of qualities of binary signals output from the n detectors comprises detecting and counting a sync signal from the binary signals output from the n detectors to obtain a count value thereof; and wherein the selecting of one of the n detectors comprises estimating qualities of the n detectors using the count value.

* * * * *